US011951869B1

(12) United States Patent
Viglucci et al.

(10) Patent No.: US 11,951,869 B1
(45) Date of Patent: Apr. 9, 2024

(54) PRESERVING BATTERY ENERGY DURING A PROLONGED PERIOD OF VEHICLE INACTIVITY

(71) Applicant: Rivian IP Holdings, LLC, Plymouth, MI (US)

(72) Inventors: Nicolas Viglucci, Costa Mesa, CA (US); Tae Hoon Park, Irvine, CA (US); Tyler Jennings Bennett, Long Beach, CA (US); Mansi Tandon, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/183,703

(22) Filed: Mar. 14, 2023

(51) Int. Cl.
*B60L 58/13* (2019.01)
*B60L 58/18* (2019.01)

(52) U.S. Cl.
CPC .............. *B60L 58/13* (2019.02); *B60L 58/18* (2019.02); *B60L 2240/545* (2013.01); *B60L 2240/547* (2013.01); *B60L 2240/62* (2013.01); *Y02T 10/70* (2013.01); *Y02T 10/72* (2013.01)

(58) Field of Classification Search
CPC .... B60L 58/13; B60L 58/18; B60L 2240/545; B60L 2240/547; B60L 2240/62; Y02T 10/70; Y02T 10/72
See application file for complete search history.

(56) References Cited

U.S. PATENT DOCUMENTS

| | | | | |
|---|---|---|---|---|
| 2012/0032637 A1* | 2/2012 | Kotooka | ................. | B60L 50/61 320/109 |
| 2012/0158227 A1* | 6/2012 | Tate, Jr. | ................. | B60W 10/26 701/22 |
| 2016/0156202 A1* | 6/2016 | Kim | ...................... | H02J 7/0014 320/134 |
| 2019/0299971 A1* | 10/2019 | Takahashi | ................. | B60K 6/40 |
| 2020/0286305 A1* | 9/2020 | Diamond | ........... | B60W 50/0205 |
| 2021/0074086 A1* | 3/2021 | Korenaga | ............... | B60L 58/10 |

* cited by examiner

*Primary Examiner* — James M McPherson
*Assistant Examiner* — Kyle J Kingsland
(74) *Attorney, Agent, or Firm* — Foley & Lardner LLP

(57) ABSTRACT

The present solution preserves an amount of charge sufficient to reach a nearest or most convenient charger in a battery of a vehicle during a prolonged vehicle disuse. The solution can include a data processing system that can identify an inactive state of a battery and determine that the vehicle should enter an energy reservation mode. The data processing system can identify a vehicle charger and determine, based on a location of the vehicle and the charger, an amount of energy needed for the vehicle to reach the charging unit. The data processing system can determine a power reservation threshold for the first battery and modify, based on the power reservation threshold, a level of energy provided by the first battery to the second battery to maintain at least the first amount of amount of energy in the first battery.

18 Claims, 4 Drawing Sheets

PRESERVING BATTERY ENERGY DURING A PROLONGED PERIOD OF VEHICLE INACTIVITY

INTRODUCTION

Electric vehicles (EVs) can store their energy in internal batteries. The energy in the batteries can be used to power electric motors used to facilitate driving of the electric vehicle.

SUMMARY

The present solution is generally directed to managing or preserving energy in batteries of a vehicle during a prolonged vehicle inactivity or disuse. A vehicle, such as an EV, can use a first battery (e.g., a high voltage battery or an HV battery) to power the electric motor of the EV in order to drive the vehicle. The vehicle can also include a second battery (e.g., a low voltage or 12V battery) to power electric components or functions of the vehicle besides the electric motor. The low voltage (LV) battery can consume energy even when the vehicle is not being driven or occupied, drawing the energy from the HV battery. This can lead to the HV battery being potentially drained during the prolonged disuse, causing a user to tow the EV in order to charge the HV battery to restart the EV.

The present technical solution is directed to intelligently preserving a sufficient amount of energy in the HV battery to allow the EV to be driven to the nearest EV charging station and avoid complete depletion of the both the HV and LV battery. The present solution can detect that an EV is in a state of prolonged inactivity or disuse, determine an amount of energy to reach an EV charger, and establish a battery threshold to preserve in the HV battery an amount of energy sufficient to reach the charger. The present solution can notify the user of decreasing energy in the LV and HV battery due to prolonged inactivity. Prompt the user to allow the vehicle to drain the low voltage battery to maintain a sufficient amount of energy to reach the charger per established battery threshold. Once the period of prolonged inactivity ends, the user can recover and use the EV by jump-starting or boosting the low voltage battery using the energy remaining in the HV battery. The user can then drive the EV, using the preserved amount of energy in the HV battery, to the selected, allowing the user to avoid usage of the towing services An aspect can be directed to a system. The system can include a data processing system comprising one or more processors and memory. The data processing system can identify a first battery, of a vehicle, configured to deliver power to a motor to drive the vehicle; and charge a second battery of the vehicle. The data processing system can establish a threshold for the first battery based on a determined amount of energy needed by the first battery to drive the vehicle to a charger. The data processing system can modify, based on the threshold, a level of charge provided by the first battery to the second battery to maintain at least the first amount of amount of energy in the first battery to drive the vehicle to the charger.

An aspect can be directed to a method. The method can include a data processing system, comprising one or more processors and memory, identifying a first battery of a vehicle. The first battery can be configured to deliver power to a motor to drive the vehicle and charge a second battery of the vehicle. The method can include the data processing system establishing a threshold for the first battery based on a first amount of energy to provide by the first battery to drive the vehicle to a charger. The method can include the data processing system modifying, based on the threshold, a level of charge provided by the first battery to the second battery to maintain at least the first amount of amount of energy in the first battery to drive the vehicle to the charger.

An aspect of the present disclosure can be directed to a vehicle. A vehicle can include one or more electric motors. The vehicle can include a first battery to deliver, at a first voltage, power to a motor of the vehicle to drive the vehicle. The vehicle can include a second battery to provide power to a component of the vehicle, wherein the component is a different type than the motor. The vehicle can include an on-board battery or energy management module or system (EMM) and controller to detect that a state of charge of the second battery is less than or equal to a first threshold. The EMM can facilitate providing power, responsive to the detection of the state of charge of the second battery is less than or equal to the first threshold, to the second battery with from the first battery. The vehicle can include a data processing system comprising one or more processors and memory to identify a second threshold for the first battery based on a first amount of energy to provide by the first battery to drive the vehicle to a charger. The one or more processors can be configured to provide, based on the second threshold, a command to the EMM to disable charging of the second battery with power delivered from the first battery to maintain at least the first amount of energy in the first battery to drive the vehicle to the charger.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
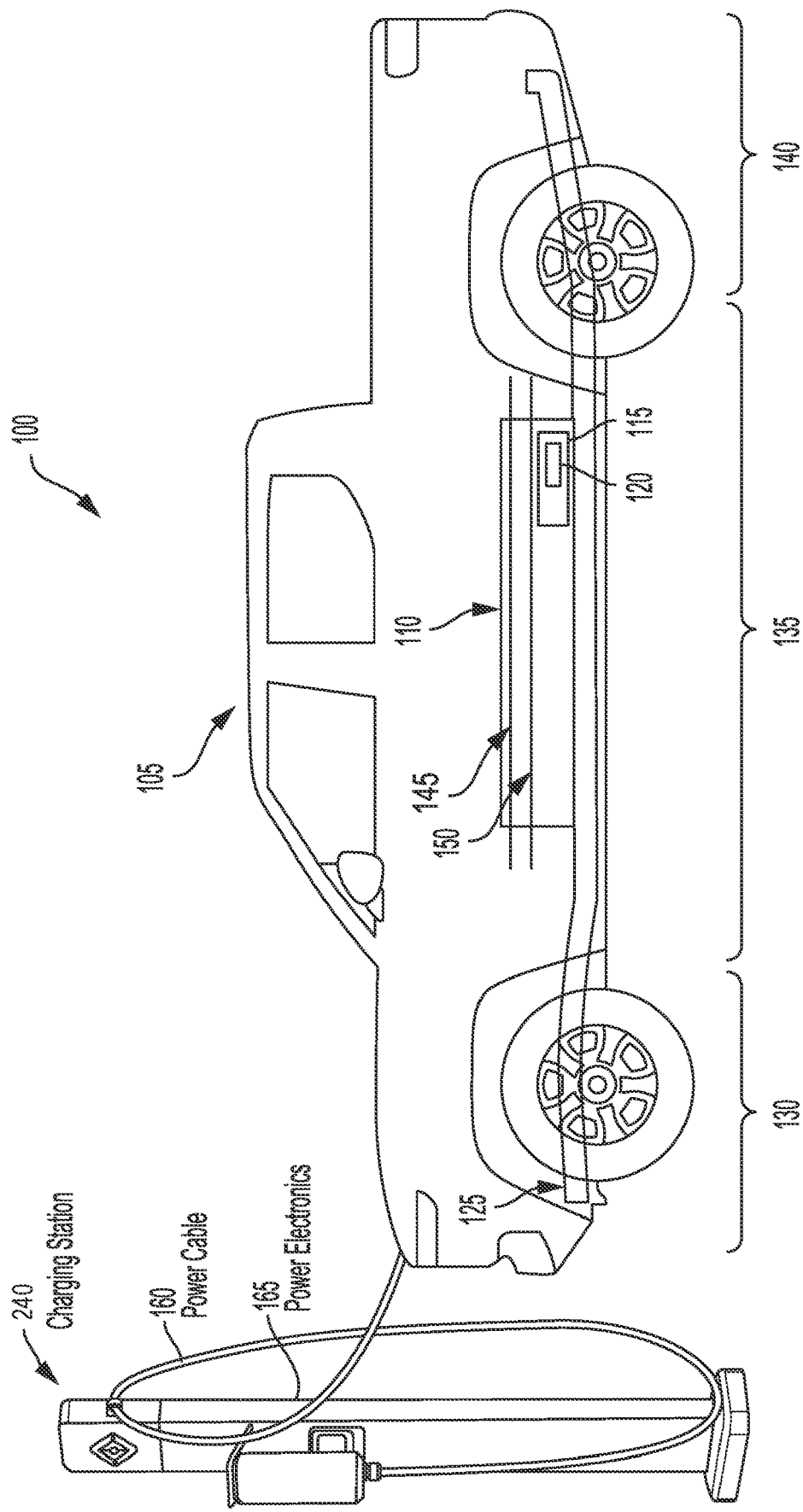
FIG. 1 depicts an example electric vehicle at a charging station.

Following below are more detailed descriptions of various concepts related to, and implementations of, methods, apparatuses, and systems for preserving energy of a battery of a vehicle for prolonged disuse. The various concepts introduced above and discussed in greater detail below may be implemented in any of numerous ways.

This disclosure is generally directed to managing or preserving energy stored in a HV battery of an EV during a period of prolonged vehicle inactivity or disuse. A vehicle, such as an electric vehicle, can use a first battery (e.g., an HV battery) to power the electric motor to drive the vehicle. The vehicle can use a second battery (e.g., a low voltage or 12V) to power other electric components or functions of the vehicle besides the electric motors. The low voltage battery can consume energy even when the vehicle is not being driven or occupied. For example, the low voltage battery can support background vehicle functions, such as over the air software updates, user greetings, interior vehicle lighting, or conditioning the high voltage pack. As the low voltage battery is drained over time (e.g., due to the powering of the background vehicle functions), the HV battery can periodically recharge the low voltage battery to allow for continued operation of background vehicle functions. When the vehicle is not connected to a charger for an extended time period, this constant or periodic power draw from the HV battery can result in the HV battery and low voltage battery being drained, which may result in user inconvenience due to the user having to jump start the low voltage battery and separately charge the high voltage battery (e.g., by towing the vehicle to a charger) in order to drive the vehicle.

This technical solution can overcome these challenges by preventing or disabling periodic recharging of the low voltage battery by the HV battery during the period of prolonged vehicle inactivity in order to preserve a sufficient amount of energy in the HV battery to allow the user to drive the EV to an EV charger at the end of the period of inactivity. The present solution can allow the vehicle to detect that the vehicle is in a state of prolonged period of inactivity, by for example, detecting that the user has not interacted with the vehicle for an extended period of time. The vehicle can determine the distance and energy to reach an EV charger using the least amount of energy. The vehicle can establish a battery threshold to preserve the determined amount of energy in the HV battery. The vehicle can notify the user of decreasing high voltage energy and prompt the user to allow the vehicle to drain the low voltage battery, while preserving the determined amount of energy in the HV battery to allow the user to drive the vehicle to the charger at the end of the prolonged period of inactivity. The vehicle can receive a permission from the user to allow the low voltage battery to be drained and preserve the energy in the HV battery. At the end of the period of inactivity, the present solution can allow the user to recover the vehicle by jumping the low voltage battery from the energy stored in the HV battery and drive the vehicle to the selected charger using the preserved energy, thereby avoiding the inconvenience associated with towing the battery drained vehicle.

FIG. 1 depicts an example cross-sectional view 100 of an electric vehicle 105 installed with at least one battery pack 110 and parked next to a charger 240. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Charger 240 can include power electronics 165 and power cable 160 for providing power to the EV 105. Power electronics 165 can include any component, part, subsystem or system of the CS 240 used to provide charging or discharging services to EVs 105. Power electronics 165 can include circuits, components or parts providing power to EVs 105 or receiving power from EVs 105. Power electronics 165 can include one or more control boxes, including power circuitry, control electronics, controllers and circuits for managing power or communication between a CS 240 and an EV 105 via a power cable 160. Power electronics 165 can include any analog and digital circuitry, including for example, AC-DC converters, DC-DC converters, DC-AC converters, any combination of power transistors, capacitors, inductors, resistors, diodes, switches, transformers, relays and other electrical or electronic components to form structures, such as half and full bridge circuits, rectifiers, filters, multi-function circuits, single or multi-stage chargers with resonant half-bridge converts utilizing one or more inductors and one or more capacitors, such as the LLC converters and single or multi-directional DC-DC converters. Power electronics 165 can be controller or managed by processors, such as processors 410. Power electronics 165 can include or be connected to memory, such as 415, 420 or 425, which can store scripts, computer code or instructions to be accessed or executed by electronic microcontrollers or devices, such as processors 410. Power electronics 165 can include one or more energy storage systems, including batteries for storing energy, as well as circuitry for interfacing with the electrical grid.

Power cable 160, also referred to as the power cord 160, can be attached to or coupled with power electronics 165 of a charger 240. Power cable 160 can include one or more electrical conductor wires or lines, including lines or wires for high power throughput as well as electronic or electrical signals. Power cable 160 can include or be connected to a power plug for plugging into an EV 105 and can include wires or lines for conducting high power, high voltage or high current between EV 105 and CS 240. Power cable 160 can include one or more wires or lines for conducting analog or digital communication signals between the EV 105 and CS 240. Power cable 160 can facilitate or provide a conduit or path for exchange of communication between EV 105 and a charger 240 and for exchange of power (e.g., electricity) between EV 105 and the charger.

Figure 2:
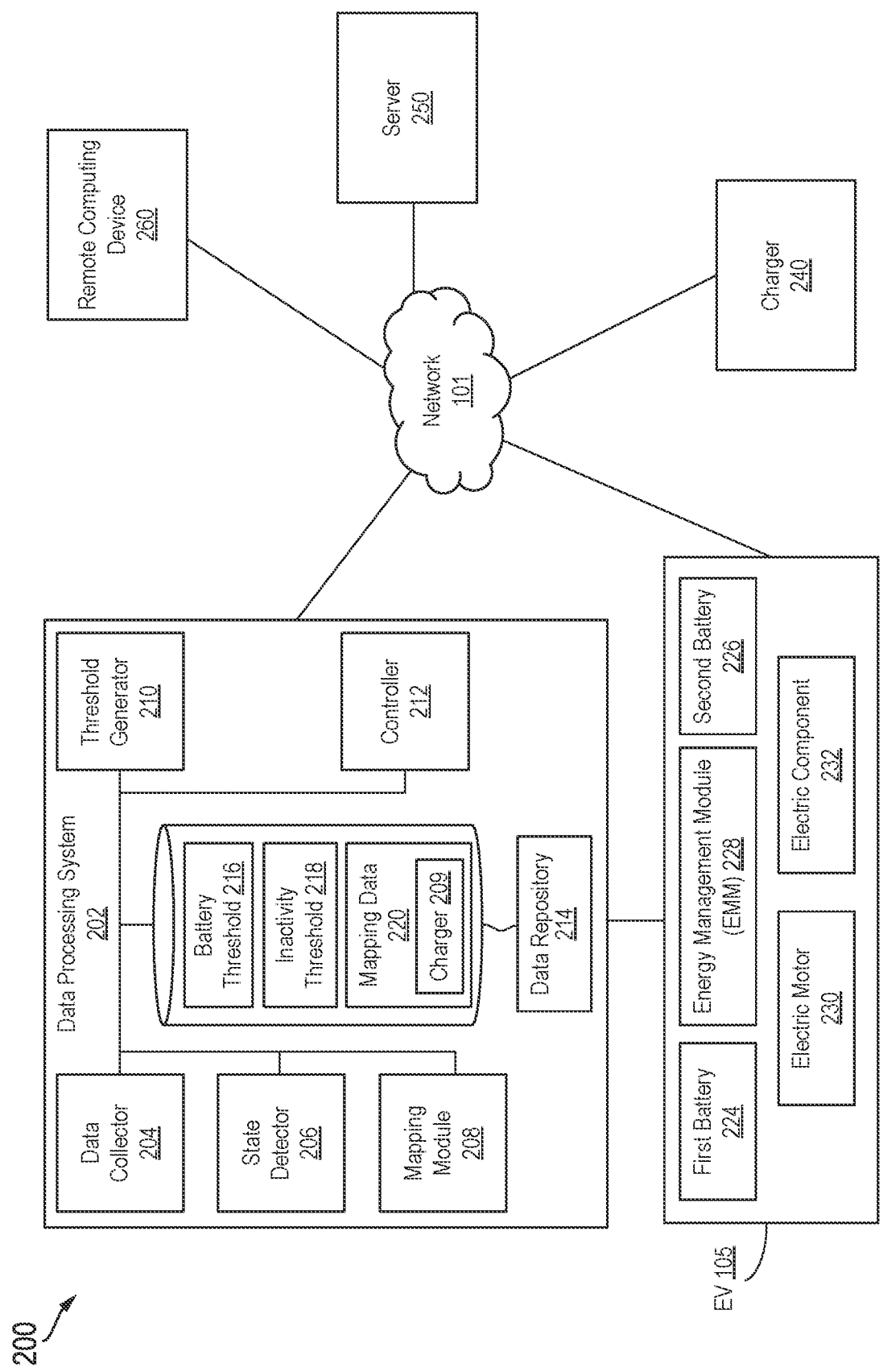
FIG. 2 depicts a block diagram of an example system for managing or preserving energy in a high voltage battery of the electric vehicle for prolonged vehicle disuse.

FIG. 2 depicts an example system 200 for preserving or managing energy storage in a high voltage (HV) battery of an EV 105. The example system 200 can include a data processing system (DPS) 202 that can be coupled with an EV 105. DPS 202 can communicate with a remote computing device 260, a server 250, a charger 240, or an EV 105, via a network 101. DPS 202 can include one or more data collectors 204, state detectors 206, charger selectors 208, threshold generators 210, controllers 212 and data repositories 214. DPS 202 can include one or more battery thresholds 216, activity or inactivity thresholds 218 and mapping data 220 showing maps or locations of chargers, such as a charger 209. EV 105 can include one or more first batteries 224, energy management modules 228, second batteries 226, electric motors 230 and electric components 232.

The example system 200 can allow a user on a remote computing device 260 (e.g., a smartphone) to control or manage energy storage in the first battery 224 (e.g., HV battery) of the EV 105. The remote computing device 260 can provide a message, an indication or an instruction to preserve a sufficient amount of energy in the first battery 224 at the end of a prolonged inactivity or disuse of the EV 105 by preventing recharging of the low voltage battery of the EV 105 beyond a battery threshold 216 for the HV battery. For example, a remote computing device 260 (e.g., a smartphone of a user) or a server 250, can communicate with a DPS 202 that is coupled with or included within, an EV 105 parked or stored for a prolonged period of inactivity or disuse (e.g., several weeks or months without charging). A second battery 226 can power electric components 232 of the EV 105 and can have its energy replenished periodically, using the energy management module 228, using the energy of the first battery 224. DPS 202 can determine that the EV 105 is in prolonged vehicle disuse based on an inactivity threshold 218 or information (e.g., a message) from a remote computing device 260. In response to detecting that the EV 105 is in a state of prolonged inactivity or disuse, the DPS 202 can utilize the charger selector 208, charger map 220 and/or data collector 204 to identify a particular charger 240 which the EV 105 can reach using the least amount of energy. DPS 202 can use the state detector 206 to identify the state of energy or state of charge of the first battery 224 and use threshold generator 210 to determine and establish the battery threshold 216 for the amount of energy to remain stored in the first battery 224 even if the second battery 226 fully drains. Depending on the setting of the system 200, the DPS 202 can use the controller 212 to allow the first battery 224 to continue replenishing the energy in the second battery 226 (e.g., via the energy management module 228) until the amount of energy remaining in the first battery 224 reaches the battery threshold 216. In response to the energy in the first battery 224 reaching or exceeding the battery threshold 216, DPS 202 can prevent further recharging of the second battery 226, allowing the second battery 226 to run out of energy to preserve energy in the first battery 224 in accordance with the battery threshold 216. In doing so, the DPS 202 can preserve in the first battery 224 an amount of energy sufficient to jump the second battery 226 at the end of the period of prolonged inactivity and drive the EV 105 to the selected charger 240, avoiding the inconvenience of using the towing services.

Server 250 can include any combination of hardware and software for providing functionality (e.g., communication applications or functions) for communicating with DPS 202, remote computing device 260 or an EV 105. Server 250 can include a computing device 400 running DPS 202 and can operate on one or more servers, any other network device, or as a function on a cloud or virtual private network service, including for example, a software as a service (SaaS) application. Server 250 can allow an application of a remote computing device 260 to communicate with a DPS 202 on an EV 105. Server 250 can allow a remote computing device 260 to communicate with the DPS 202 messages, indications, notifications or instructions relating to the disuse or inactivity of the EV 105, duration of the inactivity or disuse, charging the second battery 226 or establishing battery thresholds 216 or inactivity thresholds 218. Server 250 can include the functionality to gather, compile, store and provide information on locations of, directions to, distance to, or status of various chargers 240, such as chargers 240 in the region or vicinity of the EV 105. Server 250 can include network interfaces (e.g., modems, wired or wireless communication circuits or devices) to communicate with EV 105, DPS 202, remote computing device or a charger 240, via a network 101.

Charger 240, also referred to as the charging station 240, or a CS 240, can include any combination of hardware and software for providing electricity or otherwise electrically charging or discharging one or more batteries of one or more EVs 105. CS 240 can be a bidirectional charging station that can provide power to, or draw power from, from one or more batteries of the EV 105, such as the battery packs 110, battery modules 115 or battery cells 120 of the first battery 224 or a second battery 226. CS 240 can include scripts, functions and computer code stored in memory and executed or operating on one or more processors to implement any functionality of the CS 240. For example, CS 240 can include a computer system 400 having one or more processors 410 and memories 415, 420 and 425, each of which can store computer code, scripts, functions and instructions to implement functionality of CS 240.

Charger 240 can be a single phase charger or a three phase charger. Charger 240 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. CS 240 can include electric vehicle charging equipment that can include a power and control box and power cord or a cable 160. CS 240 can include circuitry for converting alternating current (AC) to direct current (DC), such as an AC-DC converter. CS 240 can include DC-AC converters or DC-DC converters.

Charger 240 can be rated as level-1, level-2 or level-3. For example, CS 240 can provide electricity to EVs 105 or draw power from EVs 105 at a maximum operating charger capacity at any voltage level, such as 220V, 208-240V or 400-900V. For example, charger 240 can operate power throughput or output levels between about 5 kW and 800 kW, such as for example: 5 kW, 10 kW, 20 kW, 30 kW, 50 kW, 80 kW, 100 kW, 150 kW, 120, 650 kW, 700 kW, 350 kW, 700 kW, 700 kW, 800 kW or more. For example, a level 1 charger 240 can be configured to provide services at level 1 charger capacity, which can correspond to about 110-120V, about 1.3 kW to 2.4 kW, and/or about 10 A to 20 A of current range. For example, a charger 240 can have the charger capacity set in accordance with a level 2 rated charger 240, operating at around 208V-240V, about 3 kW to 19 kW range, and about 12 A to 90 A of current range. For example, a charger 240 can have the charger capacity 250 set in accordance with level 3 rated charger 240, operating at around 400V-900V and about 50 kW to 350 kW, which can correspond to about 55 A to 875 A of current range. Charger 240 can include network interfaces (e.g., modems, wired or wireless communication circuits or devices) to communicate with EV 105, DPS 202, remote computing device or a server 250, via a network 101.

Remote computing device 260 can include any combination of hardware and software for communicating with a DPS 202. Remote computing device 260 can include a computing device 400, including a processor 410 executing instructions stored in memories (e.g., 415, 420 or 425) to communicate instructions, indications, notifications, settings or configurations to the DPS 202. Remote computing device 260 can include a smartphone, a tablet, a personal computer, a laptop. Remote computing device 260 can include a network device, such as a server, communicating with remote personal device (e.g., smartphones, tablets and laptops) of end users (e.g., users or owners of the EV 105). Remote computing device 260 can include an application for communicating with the DPS 202 (e.g., via a server 250 or network 101) to control, manage or configure energy management on the first battery 224 or second battery 226 during inactivity of the EV 105.

Data processing system (DPS) 202 can include any combination of hardware and software for preserving, adjusting, managing or otherwise controlling energy stored in a first battery 224 (e.g., HV battery) or a second battery 226 of an EV 105 during or in connection with a prolonged disuse or inactivity of the EV 105. DPS 202 can include a computing device 400, including processors 410 for processing instructions stored in memories, such as main memory 415, ROM 420 or storage device 425. DPS 202 can execute instructions to implement actions or functionalities of the DPS 202 and communicate, via network 101, with any remote computing devices 260, servers 250, chargers 240 or EVs 105. DPS 202 can be deployed on an EV 105. DPS 202 can include any functionality for managing or preserving energy in the batteries of the EV 105, including preserving energy of the first battery 224 for prolonged vehicle inactivity or disuse.

DPS 202 can include a data collector 204 to collect data on EV 105 location or location of charger 240. DPS 202 can generate a charger map 220 based on the data or information on chargers 240. DPS 202 can detect or monitor state of charger or health of batteries (e.g., first battery 224 or second battery 226). DPS 202 can include functionality when the EV 105 is in a state of prolonged disuse or inactivity, such as via inactivity threshold 218 or a message from a remote computing device 260. DPS 202 can include a charger selector 208 to select a charger 240 which the EV 105 can reach from its current location using a least amount of energy from the first battery 224. DPS 202 can include threshold generator 210 to determine and generate battery thresholds 216 for the first battery 224 (e.g., minimum amount of energy for the EV 105 to reach the selected closest charger 240) or the second battery 226 (e.g., minimum amount of energy to recharge the second battery 226). Data processing system 202 can include a controller 212 to control the recharging of the second battery 226 by the first battery 224 via the energy management module (EMM) 228.

DPS 202 can include a data collector 204, comprising any functions or applications for collecting data from the EV 105. Data collector 204 can receive, gather or collect measurements or data from sensors or detectors of the EV 105 or data received via a network 101. Data collector 204 can receive measurements of state of health, state of charge, or temperature of first battery 224 or second battery 226. Data collector 204 can receive or gather data on location (e.g., global positioning system information) of the EV 105 or one or more chargers 240 (e.g., from a function maintaining locations of chargers 240 on a server 250). Data collector 204 can receive or gather data from a state detector 206, data repository 214 (e.g., charger map 220, battery threshold 216 or inactivity threshold 218). Data collector 204 can receive instructions or data from the remote computing device 260, such as information on whether the EV 105 is in a state of prolonged inactivity (e.g., left parked and not used for one or more weeks or one or more months). DPS 202 can include network interfaces (e.g., modems, wired or wireless communication circuits or devices) to communicate with EV 105, charger 240, remote computing device or a server 250, via a network 101.

State detector 206 can include any function or application for gathering, detecting, determining or providing the state of the EV 105, or any of its components, such as the first battery 224 or the second battery 226. State detector 206 can detect the state of charge or state of health of a battery, such as a first battery 224 or second battery 226. State detector 206 can detect a temperature of the battery, a rate of charge or a rate of discharge of the first battery 224 or second battery 226.

Mapping or navigation module 208 can include GPS functionality and any function or application(s) for identifying or selecting chargers or charging stations 240 that are proximate to the location of the vehicle. Mapping or navigation module 208 can include the functionality for identifying or selecting, from mapping data 220, which includes charger data 209 the comprises of charger location mapping coordinates and charger operating characteristics (e.g., charger speed, availability, etc.), a particular charger 240 for which to safe or conserve an amount of energy corresponding to the battery threshold 216. For example, the mapping or navigation module selector 208 can select a charger 240 that is closest to the current location of the EV 105 based on the charger data 209. Mapping module 208 can select a charger 240 that may be further from the EV 105 than other chargers, but for which the EV 105 can use the least amount of energy. For example, mapping or navigation module 208 can select a first charger 240 that is further from the EV 105 than a second charger 240, but the first charger may be downhill from the EV 105 and therefore EV 105 can expend less energy to reach the first charger 240 than the amount of energy for reaching the second charger 240.

Mapping or navigation module 208 can utilize a mapping data 220 that can include locations of chargers 240 in an area or a region in which EV 105 is located. Mapping data 220 can include a geographic map with roads, highways, streets and geographic features (e.g., rivers, mountains, elevations and valleys) and can allow the charger selector 208 to determine the amount of energy for the EV 105 to expend in order to reach each particular charger 240 on the charger map 220. Charger selector 208 can take into account real-time traffic information received from a server 250, for example, in order to determine the amount of energy used to drive the vehicle from a current location to charger 240. Charger selector 208 can interface or otherwise communicate with the threshold generator 210 to determine the energy for the EV 105 to expend for each charger 240 on the charger map 220. Charger selector 208 can select a charger 240 for which the threshold generator 210 can create a corresponding battery threshold 216, based on the amount of energy.

Threshold generator 210, which can be a separate control unit or a module within other control units and modules escribed herein including the mapping module 206, controller 212, or the energy management module or system 228, can include the functionality to generate a battery threshold 216 to save or preserve in the first battery 224 an amount of energy sufficient to reach a charger 240. For example, a charger selector 208 can select a charger 240 corresponding to a least amount of energy to be used by EV 105 to reach the charger 240 (e.g., at the end of the prolonged vehicle disuse or inactivity). Threshold generator 210 can utilize the charger map 220 to determine or generate the amount of energy for the EV 105 to reach the selected charger 240. Threshold generator 210 can determine a battery threshold 216 corresponding to the determined or generated amount of energy for the EV 105 to reach the selected charger 240. For example, the threshold generator 210 can generate a battery threshold 216 that includes an additional energy buffer or offset, in addition to the determined amount of energy sufficient to reach the charger 240. For example, the threshold generator 210 can determine or provide a battery threshold 216 that corresponds to a sum of the determined amount of energy sufficient for the EV 105 to reach the selected charger 240 and an additional amount of energy corresponding up to about 10%, 20%, 30%, 40%, 50% or 100% of the determined amount of energy. The offset of additional amount of energy can allow the threshold generator 210 to conservatively estimate the sufficient amount of energy in the first battery 224 to reach the selected charger 240. The offset of additional amount of energy can include an amount of energy sufficient for the first battery 224 to jump or recharge the second battery 226 that was allowed to be fully discharge in order to preserve the energy at the first battery 224 in accordance with the battery threshold 216. Threshold generator 210 can generate a threshold for a second battery 226 to indicate an energy level at which the second battery 226 is to be recharged by the first battery 224.

Threshold generator 210 can generate an inactivity threshold 218. Inactivity threshold 218 can include a threshold for a time duration for the EV 105 to be inactive or not used (e.g., not turned on or driven) by a user. Threshold generator 210 can generate the inactivity threshold 218 to indicate a time period after which the DPS 202 can presume or determine that the EV 105 is in a prolonged state of inactivity or disuse. For example, threshold generator 210 can generate, or a user can input via a remote computing device 260, an inactivity threshold 218 for the EV 105. Inactivity threshold 218 can include, for example, a time duration of EV 105 inactivity, corresponding to up to, or about, one week, two weeks, three weeks, four weeks, a month, two months, three months or more than three months. The inactivity threshold may also be determined by the user selecting an energy reservation mode via a mobile application executing on their computing device, or based on a location of the user operating the computing device (e.g., user has opted into location sharing via an associated mobile application and is determined to be in another state or country).

The inactivity threshold 218 can be intelligently determined by the threshold generator 210 based on characteristics of the battery (e.g., battery pack 110, battery module 115 or battery cells 120). For example, threshold generator 210 can determine inactivity threshold 218 based on rate of battery discharge for HV or LV battery or a maximum energy that can be used to reach a remotely located charger or a standard (e.g., average or median) amount of energy to reach the charger. For example, inactivity threshold 218 can be established based on a type of battery pack 110, such as where inactivity threshold 218 can be set to correspond to a longer time period for an EV 105 having a larger capacity battery (e.g., a long range HV battery) and a shorter time period for an EV 105 having a standard battery (e.g., standard range HV battery). Inactivity threshold 218 can be established based on weather conditions at the location not the EV 105, such as cold or warm weather conditions. For example, cold weather conditions can result in an inactivity threshold 215 being shorter.

Controller 212 can include the functionality for determining that the EV 105 is in a state of prolonged inactivity or disuse and manage the energy storage in the first battery 224 and the second battery 226 during the state of prolonged inactivity or disuse. Controller 212 can include the functionality to periodically check if the EV 105 inactivity duration (e.g., time period since the last time when the EV 105 has been used) has exceeded the inactivity threshold 218. Controller 212 can include the functionality for controlling the charging of the second battery 226 from the energy stored in the first battery 224. Controller 212 can monitor the state of charger in the first battery 224 and determine whether the amount of energy in the first battery 224 has exceeded the battery threshold 216. Controller 212 and energy management system 228 can manage charging of the second battery 226 in response to determining that the battery threshold 216 has not been reached (e.g., the energy amount in the first battery 224 exceeds the battery threshold 216). Controller 212 can allow the second battery 226 to lapse, drain or otherwise fully discharge in response to the energy level in the first battery 224 reaching or exceeding the battery threshold 216 for the first battery. Co For example, an electric component 232 can include a function that can be powered by a second battery 226 that can count the time of inactivity or disuse of the EV. In response to the count exceeding the inactivity threshold 218, DPS 202 can determine that the EV 105 is in a state of prolonged inactivity or disuse by the user. Responsive to determining that the EV 105 is in a state of prolonged inactivity or disuse, DPS 202 can utilize the data collector 204 to collect data on chargers 240 in the area, utilize a state detector 206 to determine the state of charge or state of health of the first battery 224 and the second battery 226, and a charger selector 208 to select a charger 240. Threshold generator 210 can determine a battery threshold 216 for the selected charger 240 and the controller 212 can control or manage the recharging or powering of the second battery 226 by the first battery 224 (e.g., via the on-board charger 228) in accordance with the battery threshold 216.

Data repository 214 can include a database implemented in a storage device storing various data of the DPS 202. Data repository 214 can store data collected by data collector 204, charger map 220, battery thresholds 216 and inactivity thresholds 218. Data repository 214 can include any information from a remote computing device 260. Data repository 214 can store and provide state of charger, state of health or temperature data of first battery 224 and second battery 226.

First battery 224 or second battery 226 can include any one or more battery packs 110, battery modules 115 or battery cells 120. First battery 224 can include a high voltage battery for powering an electric motor 230 of the EV 105 to move the EV 105 across the road or terrain. First battery 224 can include an entire battery pack 110. The battery pack 110 can include one or more battery modules 115, each one including a plurality of battery cells 120. The battery pack can include a plurality of battery cells 120. For example, a first battery 224 can include one or more battery packs 110 providing an output of between about 400V and 800V. First battery 224 can include a larger energy storage capacity than the second battery 226. Second battery 226 can include, for example, an auxiliary battery having a 12V battery output for powering electric components 232, such as headlights, audio systems, computer controls. Electric components 232 powered by the second battery 226 can include DPS 202 or any of its components, such as a data collector 204, charger selector 208, threshold generator 210 or controller 212. Electric components 232 can include EV 105 sensors (e.g., cameras, temperature sensors, proximity sensors), as well as a system clock, a computing system 400 or a DPS 202.

Battery or energy management system 228 can include the functionality to charge the second battery 226 with the energy stored in the first battery 224. On-board charger 228 can include the functionality to determine when a battery threshold 216 of the second battery 226 has been exceeded (e.g., the second battery 226 has its energy level below a threshold). In response to the second battery 226 having its energy level meet or fall below the battery threshold 216, the on-board charger 228 can charge the second battery 226. If the battery threshold 216 of the first battery is reached, DPS 202 can prevent the on-board charger 228 to charge the second battery 226 in order to preserve the energy corresponding to the battery threshold 216 of the first battery 224 in the first battery 224.

The present solution can include a system (e.g., system 200) for managing and preserving energy stored in a first battery 224 (e.g., HV battery) of an EV 105 during a prolonged vehicle disuse. The system 200 can include a data processing system 202 comprising one or more processors 410 and memory (e.g., 415, 420 or 425) to implement the functionality of the present solution. DPS 202 can identify a first battery 224 of an electric vehicle 105. DPS 202 can identify an inactive state of a first battery or a second battery of a vehicle has exceeded an inactivity threshold. The inactive state can be or include a state of prolonged inactivity or disuse. The inactivity threshold can include any time period during which the EV 105 has been inactive (e.g., at least one or more hours, one or more days, one or more weeks or one or more months). The first battery 224 can be configured to deliver power to an electric motor 230 to drive the electric vehicle 105. The first battery 224 can be configured to provide energy or otherwise charge a second battery 226 of the electric vehicle 105. The first battery 224 can be configured to charge a second battery 226 when the second battery reaches a second battery threshold 216 of the second battery.

Based on the inactive state, DPS 202 can determine that the EV 105 should enter an energy reservation mode. The energy reservation mode can include a mode of operation of the EV 105 in which the DPS 202 monitors the energy remaining in the first battery (e.g., high voltage battery pack 110) to ensure that a sufficient amount of energy remains in the first battery in order to reach a charger 204 (e.g., charging unit or charging station at which the first battery can be recharged). The energy reservation mode can include the DPS 202 preserving an amount of energy in the first battery (e.g., battery pack 110) in accordance with the power reservation threshold (e.g., battery threshold 216) that can correspond to the amount of power to remain within the first battery at the end of the energy reservation mode (e.g., until the driver of the EV 105 starts using the EV 105 again).

Responsive to the determination that the EV 105 should enter the energy reservation mode, the DPS 202 can identify an EV 105 charging unit 204 proximate to the vehicle. The charging unit 204 (also referred to as the charger 204) proximate to the vehicle can be a charging unit 204 within a reach of the charging or power cable 160 from the EV 105. The charging unit 204 proximate to the EV 105 can be a charger 204 that is located a set distance apart from the current location of the EV 105. For example, the charging unit 204 can be one or more miles away from the location of the EV 105.

Responsive to the determination that the EV 105 should enter the energy reservation mode, the DPS 202 can determine, based on a location of the vehicle and a location of the charging unit 204, a first amount of energy needed by the first battery (e.g., battery pack 110) for the EV 105 to reach the charging unit 204. For example, DPS 202 can determine an amount of energy, power or state of charge of the first battery. For example, DPS 202 can determine the amount of energy, power or state of charge to remain in the first battery at the end of the energy reservation mode.

Responsive to the determination that the EV 105 should enter the energy reservation mode and based on the first amount of energy, DPS 202 can determine a power reservation threshold for the first battery. The power reservation threshold can include a threshold or a value of power, energy or state of charge of the first battery (e.g., high voltage battery of the EV 105). The power reservation threshold can indicate or correspond to the minimum amount of energy, charge or state of charge remaining in the first battery at the end of the of the energy reservation mode.

DPS 202 can establish a battery threshold 216 for the first battery 224. The battery threshold 216 for the first battery 224 can be based on a first amount of energy to provide by the first battery 224 to drive the electric vehicle 105 to a charger 240. For example, based on the first amount of energy, DPS 202 can determine a power reservation threshold for the first battery to provide by the first battery to drive the vehicle to a charger. The first amount of energy can be an amount of energy determined by the threshold generator 210 using the charger map 220. For example, a data collector 204 can collect data on the EV 105, including for example, inactivity period identifying a duration of time during which the EV 105 has not been used by the user.

DPS 202 can provide a notification to the end user that the second battery is nearly depleted. For example, DPS 202 can determine that the low voltage battery is nearly depleted in response to detecting that the low voltage battery of the EV 105 has a remaining amount of energy or charge that is less than a predetermined threshold, such as less than 20%, 15%, 10% or 5% of the maximum state of charge or maximum energy that can be stored in the low voltage battery. DPS 202 can send to the remote computing device (e.g., user device) a message (e.g., a prompt) that recharging of the second battery (e.g., low voltage battery) from the first battery (e.g., high voltage battery) will be needed prior to the next usage of the EV 105 by the user. In response to the message, the user can identify a time estimate when the first battery should recharge the second battery. For example, the first battery can allow the second battery to become depleted of energy and then replenish the energy in the second battery at the time set by the user.

In response to detecting or determining that the inactivity period exceeds the inactivity threshold 218 (e.g., a time period of one or more weeks or months), DPS 202 can detector or determine that the EV 105 is in a state of prolonged inactivity or disuse. For example, in response to determining that the inactivity period exceeds the inactivity threshold 218, the DPS 202 can send a message to a remote computing device 260 prompting the user to confirm or deny that the EV 105 is in a state of prolonged inactivity. Upon receiving a configuration from the remote computing device 260, via the network 101, DPS 202 can determine that the EV 105 is in a state of prolonged inactivity or disuse. State detector 206 can determine a state of charge or state of health of the first battery 224 (e.g., HV battery). Charger selector 208 can utilize a charger map 220 from the data repository 214 to identify one or more chargers 240 that the EV 105 can reach from its current location with a least amount of energy. For example, DPS 202 can determine, responsive to the state of the EV 105, that the inactive state of the first battery (e.g., battery pack 110) or the second battery has exceeded the inactivity threshold. For example, in response to the state of the vehicle (e.g., EV 105 being inactive longer than the inactivity threshold) that the inactivity threshold has been exceeded by the EV 105.

DPS 202 can determine, establish, provide or modify, based on the battery threshold 216, a level of charge provided by the first battery 224 to the second battery 226 to maintain at least the first amount of amount of energy in the first battery 224 to drive the electric vehicle 105 to the electric charger 240. For example, controller 212 of the DPS 202 can control the amount of charge provided by the on-board charger 228, from the first battery 224 to the second battery 226. For example, based on the least amount of energy to reach a charger 240, threshold generator 210 can generate a battery threshold 216 to preserve the least amount of energy sufficient to reach the charger 240. For example, DPS 202 can prevent, based on the battery threshold 216, delivery of power from the first battery 224 to the second battery 226 to maintain at least the first amount of energy in the first battery 224 to drive the electric vehicle 105 to the charger 240.

System 200 can include the first battery 224 configured to deliver power with a first voltage to the electric motor 230 to drive the electric vehicle 105. System 200 can include the first battery 224 having a battery pack 110 comprising a plurality of battery cells 120. For example, the system 200 can include the first battery 224 having a battery pack 110, comprising a plurality of battery modules 115 that include a plurality of battery cells 120. System 200 can include the second battery 226 configured to deliver power with a second voltage to an electric component 232 of the electric vehicle 105 different from the electric motor 230. The second voltage can be less than the first voltage. The first voltage of the first battery 224 can be 400-1000V (e.g., 600V). The second voltage of the second battery can be about 10-25V (e.g., 12V).

DPS 202 can be configured to determine a state of the electric vehicle 105. The state of the electric vehicle can include a state of prolonged inactivity. The state of prolonged inactivity can include inactivity that exceeds an inactivity threshold 218. Inactivity threshold can include, for example, a time duration of at least one week, two weeks, three weeks, four weeks, one month, two months, three months or more than three months. DPS 202 can be configured to determine, responsive to the state of the vehicle, the battery threshold 216 to prevent the delivery of power from the first battery 224 to the second battery 226.

DPS 202 can be configured to identify a health of the first battery 224. DPS 202 can be configured to establish the battery threshold 216 (e.g., power reservation threshold) for the first battery 224 based on the first amount of energy and the health of the first battery. For example, threshold generator 210 can account for a state of health of the battery when determining or establishing the battery threshold 216. For example, threshold generator 210 can increase the battery threshold 216 (e.g., add an additional amount of energy to the battery threshold 216) in response to the health of the battery, or in response to the battery health being below a predetermined threshold of the health of the battery.

DPS 202 can be configured to predict an ambient temperature of the first battery 224 over a time interval. For example, DPS 202 can determine that ambient temperature is expected to be below a temperature threshold for a duration of the time period of the prolonged inactivity of the EV 105. DPS 202 can be configured to establish the battery threshold 216 (e.g., power reservation threshold) for the first battery 224 based on the first amount of energy and the predicted ambient temperature of the first battery 224 over the time interval.

DPS 202 can be configured to determine a level of inactivity of the electric vehicle 105. DPS 202 can be configured to determine, responsive to the level of inactivity less than an inactivity threshold 218, to identify a plurality of chargers 240 within a radius threshold of a location of the electric vehicle 105. DPS 202 can be configured to determine a plurality of amounts of energy to drive the electric vehicle 105 from the location to the plurality of chargers 240. DPS 202 can be configured to rank the plurality of chargers 240 based on the plurality of amounts of energy. DPS 202 can be configured to select the charger 240 from the plurality of chargers 240 based on the rank. For example, charger selector 208 can determine a charger 240 for which a least amount of energy is sufficient for the EV 105 to reach. For example, charger selector 208 can determine a charger 240 for which a least amount of energy is sufficient for the EV 105 to reach.

DPS 202 can be configured to determine the electric vehicle 105 is parked at a location. DPS 202 can be configured to determine a first distance between the charger 240 and the location. DPS 202 can be configured to identify a second charger 240 located a second distance from the location. The second distance can be less than the first distance. DPS 202 can be configured to determine a second amount of energy to drive the electric vehicle 105 from the location to the second charger 240. The second amount of energy can be greater than the first amount of energy. DPS 202 can be configured to select, responsive to the first amount of energy less than the second amount of energy, the charger and the first amount of energy to use to set the battery threshold 216 (e.g., power reservation threshold).

DPS 202 can be configured to determine the electric vehicle 105 is unoccupied for a duration of time, such as a time duration corresponding to an inactivity threshold 218. DPS 202 can be configured to provide, responsive to the electric vehicle 105 unoccupied for the duration, a prompt to a computing device 260 remote from the data processing system 202. DPS 202 can be configured to receive, responsive to the prompt, an indication to prevent the delivery of power from the first battery 224 to the second battery 226 to maintain at least the first amount of energy in the first battery 224 to drive the electric vehicle 105 to the charger 240.

DPS 202 can be configured to receive data from one or more sensors of the electric vehicle 105. For example, data collector 204 can receive sensor data, including temperature measurements from a temperature sensor, inactivity duration measurement from a circuit measuring time period since last time when EV 105 was used, or state of charge or state of health of the first battery 224 or second battery 226. DPS 202 can be configured to increase the battery threshold 216 (e.g., first power reservation threshold) to a second battery threshold 216 (e.g., second battery reservation threshold) that is greater than the battery threshold 216. For example, the battery threshold 216 can be increased or adjusted to account for temperature reading, state of health of the battery, state of charge of the battery, or an update as to the location of the closest available charger 240. DPS 202 can be configured to prevent, based on the second battery threshold 216, the delivery of power from the first battery 224 to the second battery 226 to maintain the at least the first amount of energy in the first battery 224 to drive the electric vehicle 105 to the charger 240.

DPS 202 can be configured to detect a state of charge of the first battery 224. DPS 202 can be configured to compare the state of charge of the first battery 224 with the battery threshold 216. DPS 202 can be configured to provide, based on the comparison of the state of charge of the first battery 224 with the battery threshold 216, to a computing device 260 remote from the data processing system 202, a prompt comprising a notification that the first battery and second battery are near depletion and that the vehicle will enter a energy reservation mode (i.e., LV battery drained and HV battery set to battery threshold) within a determined time period (e.g., after 24 hours). DPS 202 can be configured to receive, responsive to the prompt, an indication from the computing device 260 to enter the energy reservation mode. DPS 202 can be configured to facilitate, responsive to the indication from the computing device 260 to enter the energy reservation mode, prevent charging of the second battery 226 by the first battery 224 such that power from the second battery reaches depletion.

In some aspects, system 200 is directed to a vehicle, such as an EV 105. The vehicle (e.g., EV 105) can include one or more electric motors 230, a first battery 224 to deliver, at a first voltage, power to electric motor 230 of the vehicle to drive the vehicle. The vehicle can include a second battery 226 to provide power to an electric component 232 of the vehicle. The electric component 232 can be a different type of component than the electric motor 230, such as vehicle control electronics or a computing system providing a data processing system. The vehicle can include an on-board charger 228 to detect that a state of charge of the second battery 226 is less than or equal to a first battery threshold 216 of the second battery 226. The on-board charger 228 can charge, responsive to the detection of the state of charge of the second battery 226 is less than or equal to the first battery threshold 216 of the second battery 226, the second battery 226 with power delivered from the first battery 224. The vehicle can include a data processing system 202 comprising one or more processors 410 and memory (e.g., 415, 420 or 425). One or more processors 410 of the DPS 202 can identify a second battery threshold 216 for the first battery 224 based on a first amount of energy to provide by the first battery 224 to drive the vehicle to a charger 240. One or more processors 410 of the DPS 202 can provide, based on the second threshold, a command to the on-board charger 228 to disable charging of the second battery 226 with power delivered from the first battery 224 to maintain at least the first amount of energy in the first battery 224 to drive the vehicle to the charger 240.

DPS 202 can determine the vehicle is unoccupied for a duration (e.g., a duration corresponding to an inactivity threshold 218). DPS 202 can provide, responsive to the vehicle unoccupied for the duration, a prompt to a computing device 260 remote from the DPS 202. DPS 202 can receive, responsive to the prompt from the computing device 260, authorization to disable charging of the second battery 226 with power delivered from the first battery 224 to maintain at least the first amount of energy in the first battery 224 to drive the vehicle to the charger 240. DPS 202 can, in response to the authorization, collect data via a data collector 204, determine a state of charge or state of health of the first battery 224 via the state detector 206, select a charger 240 via a charger selector 208 and establish a battery threshold 216 for the first battery 224 by the threshold generator 210.

Figure 3:
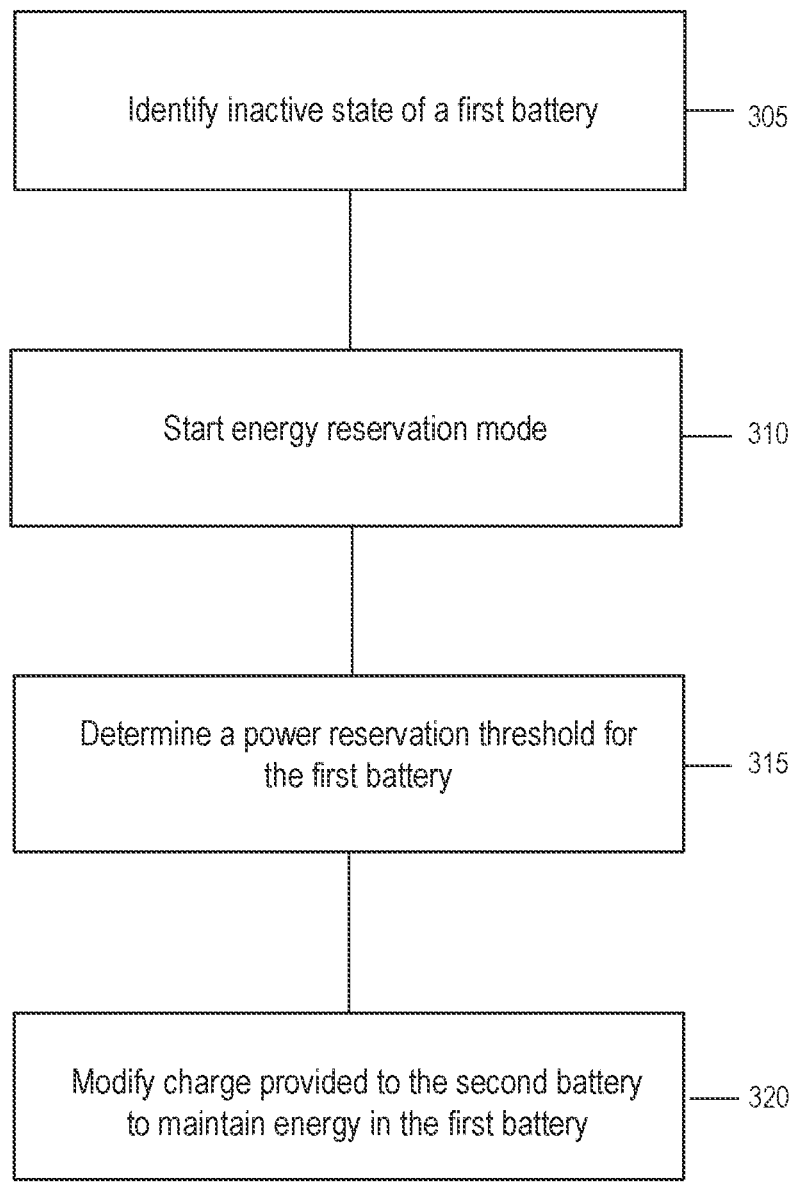
FIG. 3 is a flow diagram illustrating an example method of managing or preserving energy in a high voltage battery of the electric vehicle for prolonged vehicle disuse.

FIG. 3 illustrates a method 300 of managing energy storage in batteries of a vehicle during a prolonged inactivity or disuse. The method 300 can be implemented using a system 200 depicted in FIG. 2, in which a DPS can manage the energy stored in a HV battery (e.g., a first battery) and an auxiliary battery (e.g., the second battery) of the EV during a prolonged period inactivity to preserve, in the HV battery, a sufficient amount of energy to allow the EV to reach a remote charger (at the end of the period of inactivity) to charge the EV and avoid usage of towing services. The method can include ACTS 305-315. At ACT 305, a data processing system can identify an inactive state of a first battery. At ACT 310, the data processing system can establish a threshold for the first battery. At ACT 315, the data processing system can modify a charge provided to the second battery to maintain energy in the first battery.

At ACT 305, a data processing system can identify an inactive state of a first battery. The method can include a data processing system comprising one or more processors and memory identifying a first battery (e.g., an HV battery) of a vehicle. The method can include a data processing system identifying an inactive state of a first battery. The first battery can be configured to deliver power to an electric motor to drive the vehicle. The first battery can include a larger voltage than a second battery and can be used to charge the second battery of the vehicle. The first battery can operate at a voltage range of about 400V to 1000V (e.g., 600V). The second battery can operate at a voltage range of about 10V to 25V (e.g., 12V). The inactive state can be identified or determined in response to the data processing system determining that a time duration for which the vehicle has been inactive or unused has exceeded an inactivity threshold. The inactive state can include a state in which the first battery is not used for powering electric motor of the vehicle for a period of time (e.g., one or more days, one or more weeks or one or more months).

The first battery can be configured to deliver power with a first voltage to the one or more electric motors drive the vehicle. The first battery can be configured to deliver power to a motor of the vehicle to drive the vehicle and provide energy to the second battery of the vehicle. The first battery can include a battery pack comprising a plurality of battery cells or a battery pack comprising a plurality of battery modules having a plurality of battery cells. The second battery can be configured to deliver power with a second voltage to one or more electric components of the vehicle different from the one or more electric motors. The electric vehicle can be configured to allow an on-board charger to charge the second battery with the energy stored in the first battery.

At ACT 310, the data processing system can determine to start or enter an energy reservation mode. The data processing system can determine to start or enter the energy reservation mode in response to determining that the inactive state has exceeded the inactivity threshold. Based on the inactive state (e.g., determining that the vehicle is in the inactive state), the data processing system can determine that the vehicle should enter the energy reservation mode. Based on the inactive state and responsive to the determination that the vehicle should enter the energy reservation mode, the data processing system can identify a vehicle charging unit proximate to the vehicle. Based on the inactive state or based on a location of the vehicle and a location of the charging unit, the data processing system can determine a first amount of energy needed by the first battery for the vehicle to reach the charging unit. The first amount of energy can correspond to an amount of energy to be stored or saved in the first battery to ensure that the vehicle can reach a charging unit to recharge the first battery. The charging unit can include any charger a set distance apart from the vehicle, such as one or more yards apart or one or more miles apart.

The data processing system can determine that the vehicle is in the inactive state in response to determining that the vehicle has been idle for a period of time that exceeds inactivity an threshold (e.g., one or more days, weeks or months). The inactivity period can be set by the user or driver of the vehicle. The inactivity period can be established via an application on a user device, such as a remote computing device (e.g., the user's smartphone). The energy restoration mode can be established, detected or determined in response to an input by the user on the application for the vehicle via the remote computing device. For example, the user can send an indication (e.g., responsive to a prompt initiated responsive to the determined inactive state) that the vehicle should start or enter the energy reservation mode. The vehicle can enter the energy reservation mode in response to the indication. The location of the charging unit based on which the first amount of energy is to be determined can be selected by data processing system or the user from the remote computing device.

The start of the energy reservation mode can be set based on a user input. For example a data processing system can provide a notification to the end user that the second battery is nearly depleted. For example, data processing system can determine that the low voltage battery is nearly depleted in response to detecting that the low voltage battery of the vehicle has a remaining amount of energy or charge that is less than a predetermined threshold, such as less than 20%, 15%, 10% or 5% of the maximum state of charge or maximum energy that can be stored in the low voltage battery. Data processing system can send to the remote computing device (e.g., user device) a message (e.g., a prompt) that recharging of the second battery (e.g., low voltage battery) from the first battery (e.g., high voltage battery) will be needed prior to the next usage of the vehicle by the user. In response to the message, the user can identify a time estimate when the first battery should recharge the second battery. For example, the first battery can allow the second battery to become depleted of energy and then replenish the energy in the second battery at the time set by the user.

At ACT 315, the data processing system can determine or establish a power reservation threshold for the first battery. The method can include the data processing system comprising one or more processors and memory establishing a power reservation threshold for the first battery based on a first amount of energy to provide by the first battery to drive the vehicle to a charger. Data processing system can determine that the vehicle has been inactive for a period of time that exceeds an inactivity threshold. In response to the vehicle being inactive for longer than an inactivity threshold, the data processing system can send to a remote computing device of a user (e.g., owner of the vehicle) a message prompting whether the vehicle is in a prolonged state of inactivity (e.g., the vehicle is in the energy reservation mode). The message can, for example, prompt the user to indicate a time duration for which the vehicle is going to be inactive of unused. Data processing system can, in response to the response to the prompt, receive an authorization to preserve energy in the first battery and let the second battery drain. For example, the data processing system can determine that the vehicle is in a state of prolonged inactivity or disuses in response to the vehicle exceeding the inactivity threshold or not hearing back from the user at the remote computing device.

In response to the authorization by the user or determination that the vehicle is in a state of prolonged disuse (e.g., energy reservation mode), data collector can collect data corresponding to the vehicle (e.g., ambient temperature, state of charge of the batteries, state of health of the batteries, weather conditions, data on locations of chargers in the vicinity or region of the vehicle. State detector can determine a state of charge or state of health of the first battery or the second battery. Charger selector can select, from a plurality of chargers on a charger map (e.g., chargers in the vicinity or region of the vehicle), a particular charger for which a minimal or smallest amount of energy is sufficient for the vehicle to reach. Based on the amount of energy sufficient to reach the charger (e.g., nearest or most easily accessible charger), threshold generator can determine or establish a battery threshold for the first battery to ensure that the sufficient amount of energy to reach the charger is preserved in the first battery.

For example, the data processing system can determine a level of inactivity of the vehicle. The data processing system can determine, responsive to the level of inactivity exceeding an inactivity threshold, to identify a plurality of chargers within a radius threshold of a location of the vehicle. The battery threshold can be established or determined in accordance with a sufficient amount of energy to reach the plurality of chargers within the radius.

For example, the data processing system can determine a state of the vehicle. The data processing system can determine, responsive to the state of the vehicle, the threshold to prevent the delivery of power from the first battery to the second battery. For example, the data processing system can identify a health of the first battery. The data processing system can establish the threshold for the first battery based on the first amount of energy and the health of the first battery. For example, the data processing system can predict an ambient temperature of the first battery over a time interval. The data processing system can establish the threshold for the first battery based on the first amount of energy and the predicted ambient temperature of the first battery over the time interval.

At ACT 320, the data processing system can modify a charge or level of energy or power provided to the second battery to maintain energy in the first battery. The method can include the data processing system comprising one or more processors and memory, modifying based on the threshold, a level of charge provided by the first battery to the second battery to maintain at least the first amount of amount of energy in the first battery to drive the vehicle to the charger. The modified level of charge can include a reduced level of charge or a level of charge corresponding to zero (e.g., no charge to be provided to the second battery). The data processing system can determine, establish or provide, based on the battery threshold established to maintain or preserve the amount of energy sufficient to reach the selected charger, a level of charge corresponding to the sufficient amount of energy to drive the vehicle and reach the selected charger.

The controller of the data processing system can manage, control or limit the amount of charge provided by the on-board charger from the first battery to the second battery in accordance with the battery threshold. The data processing system can determine a plurality of amounts of energy to drive the vehicle from the location to the plurality of chargers. The data processing system can rank the plurality of chargers based on the plurality of amounts of energy. The data processing system can select the charger from the plurality of chargers based on the ranking. The data processing system can select one or more chargers from the plurality of chargers. The battery threshold for the first battery can be established based on the one or more chargers. The data processing system can reduce the amount of charge provided to the second battery in response to, or in accordance with, the battery threshold.

The data processing system can determine the vehicle is parked at a location. The data processing system can determine a first distance between the charger and the location. The data processing system can identify a second charger located a second distance from the location. The second distance to the second charger can be less than the first distance to the first charger. The data processing system can determine a second amount of energy to drive the vehicle from the location to the second charger. The second amount of energy can be greater than the first amount of energy to reach the first charger, despite the distance to the second charger being shorter. The data processing system can select, responsive to the first amount of energy less than the second amount of energy, the charger and the first amount of energy to use to set the threshold. Responsive to the first amount of energy less than the second amount of energy, the data processing system can establish the battery threshold in accordance with the first amount of energy to ensure that the first amount of energy is preserved in the first battery at the end of the prolonged period of inactivity. The data processing system can establish the battery threshold to include an additional amount of energy corresponding to an offset of the amount of energy sufficient to reach the selected charger. The offset can include, for example, an amount of energy for jumping the second battery, an amount of energy to account for energy dissipation due to weather conditions or temperature, an amount of energy to account for the state of health of the first battery, an amount of energy to account for unexpected traffic on the way to the selected charger or an amount of energy to provide for any unexpected energy expenditures. The offset can include, for example, an additional 5%, 10%, 15%, 20%, 25%, 30%, 40%, 50% or more than 50% of the energy sufficient to reach the selected charger.

The data processing system can determine the vehicle is unoccupied for a duration. For example, the data processing system can include a sensor or a counter for detecting or tracking the amount of time since the last usage (e.g. driving) of the vehicle. In response to the vehicle being inactive for longer than an inactivity threshold, data collector or data processing system can determine that the vehicle is in a state of prolonged inactivity or disuse. The data processing system can provide, responsive to the vehicle being unoccupied for the duration or responsive to determining that the vehicle is in a state of prolonged inactivity, a prompt to a computing device remote from the data processing system. The data processing system can receive, responsive to the prompt, an indication to prevent the delivery of power from the first battery to the second battery to maintain at least the first amount of energy in the first battery to drive the vehicle to the charger.

Figure 4:
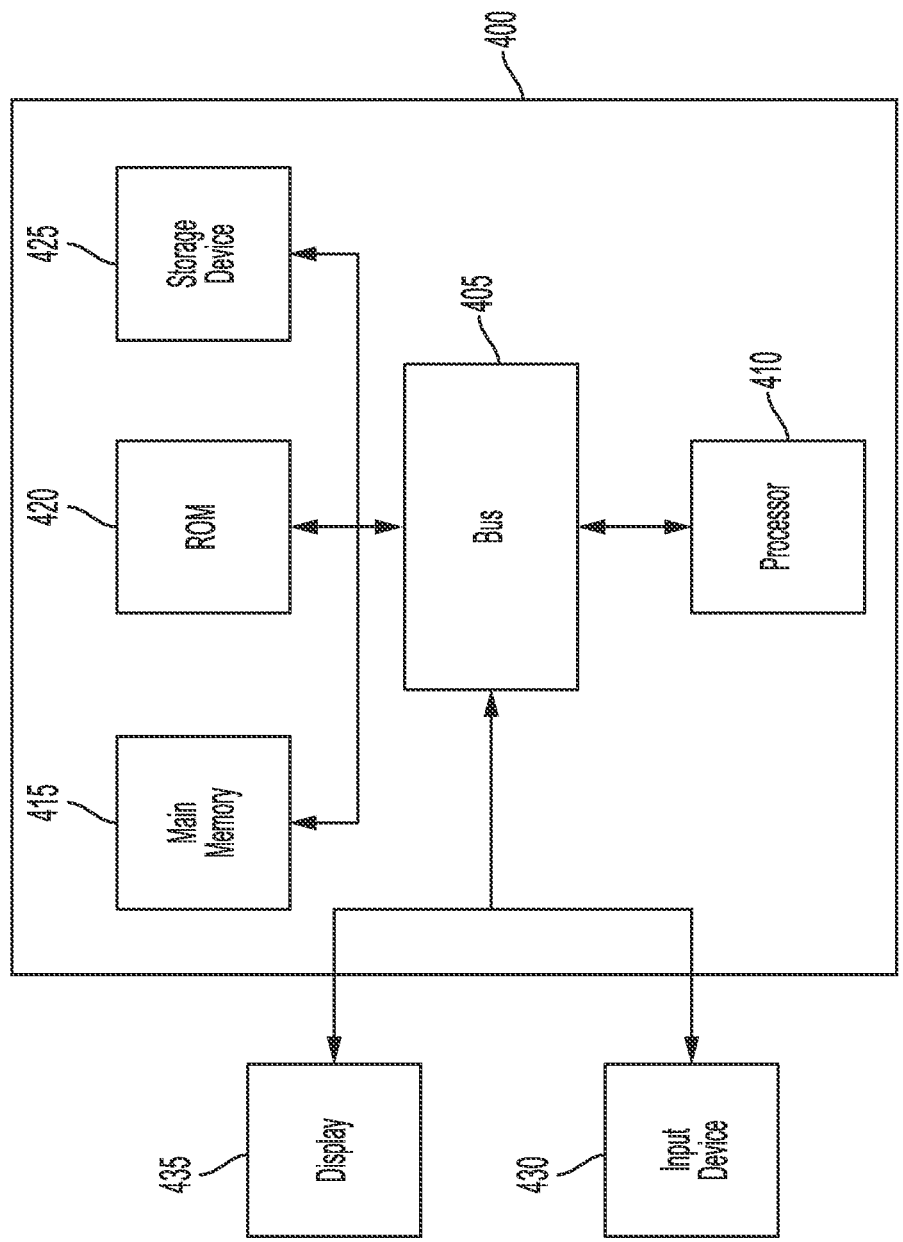
FIG. 4 is a block diagram illustrating an architecture for a computer system that can be employed to implement elements of the systems and methods described and illustrated herein.

FIG. 4 depicts an example block diagram of an example computer system 400. The computer system or computing device 400 can include or be used to implement a data processing system or its components. The computing system 400 includes at least one bus 405 or other communication component for communicating information and at least one processor 410 or processing circuit coupled to the bus 405 for processing information. The computing system 400 can also include one or more processors 410 or processing circuits coupled to the bus for processing information. The computing system 400 also includes at least one main memory 415, such as a random access memory (RAM) or other dynamic storage device, coupled to the bus 405 for storing information, and instructions to be executed by the processor 410. The main memory 415 can be used for storing information during execution of instructions by the processor 410. The computing system 400 may further include at least one read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions.

The computing system 400 may be coupled via the bus 405 to a display 435, such as a liquid crystal display, or active matrix display, for displaying information to a user such as a driver of the electric vehicle 105 or other end user. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, ele- ments and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, a positive or a negative terminal of a battery, or power direction when an electric vehicle is charged or discharged. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a data processing system comprising one or more processors and memory to:
   identify, responsive to a time duration for which a vehicle has been inactive, that an inactive state of a first battery of the vehicle has exceeded an inactivity threshold for the first battery, wherein the first battery is configured to deliver power to a motor of the vehicle to drive the vehicle and provide energy to a second battery of the vehicle;
   based on the inactive state exceeding the inactivity threshold, determine that the vehicle should enter an energy reservation mode;
   responsive to the determination that the vehicle should enter the energy reservation mode:
   identify a vehicle charging unit proximate to the vehicle;
   determine, based on a location of the vehicle and a location of the charging unit, a first amount of energy needed by the first battery for the vehicle to reach the charging unit;
   based on the first amount of energy, determine a power reservation threshold for the first battery; and
   modify, based on the power reservation threshold, a level of energy provided by the first battery to the second battery to maintain at least the first amount of amount of energy in the first battery.

2. The system of claim 1, wherein:
   the first battery is configured to deliver power with a first voltage to the motor to drive the vehicle, and the first battery comprises a battery pack comprising a plurality of battery cells; and
   the second battery is configured to deliver power with a second voltage to an electric component of the vehicle different from the motor, the second voltage less than the first voltage.

3. The system of claim 1, comprising the data processing system to:
   determine a state of the vehicle; and determine, responsive to the state of the vehicle, that the inactive state of the first battery or the second battery has exceeded the inactivity threshold.

4. The system of claim 1, comprising the data processing system to:
identify a health of the first battery; and
establish the power reservation threshold for the first battery based on the first amount of energy and the health of the first battery.

5. The system of claim 1, comprising the data processing system to:
predict an ambient temperature of the first battery over a time interval; and
establish the power reservation threshold for the first battery based on the first amount of energy and the predicted ambient temperature of the first battery over the time interval.

6. The system of claim 1, comprising the data processing system to:
determine a level of inactivity of the vehicle;
determine, responsive to the level of inactivity exceeding an inactivity threshold, to identify a plurality of chargers within a radius threshold of a location of the vehicle;
determine a plurality of amounts of energy to drive the vehicle from the location to the plurality of chargers;
rank the plurality of chargers based on the plurality of amounts of energy; and
select the charger from the plurality of chargers based on the rank.

7. The system of claim 1, comprising the data processing system to:
determine the vehicle is parked at a location;
determine a first distance between the charger and the location;
identify a second charger located a second distance from the location, the second distance less than the first distance;
determine a second amount of energy to drive the vehicle from the location to the second charger, the second amount of energy greater than the first amount of energy; and
select, responsive to the first amount of energy less than the second amount of energy, the charger and the first amount of energy to use to set the threshold.

8. The system of claim 1, comprising the data processing system to:
determine the vehicle is unoccupied for a duration;
provide, responsive to the vehicle unoccupied for the duration, a prompt to a computing device remote from the data processing system; and
receive, responsive to the prompt, an indication to prevent the delivery of power from the first battery to the second battery to maintain at least the first amount of energy in the first battery to drive the vehicle to the charger.

9. The system of claim 1, comprising the data processing system to:
receive data from one or more sensors of the vehicle;
increase the power reservation threshold to a second power reservation threshold that is greater than the power reservation threshold; and
prevent, based on the second threshold, the delivery of power from the first battery to the second battery to maintain the at least the first amount of energy in the first battery to drive the vehicle to the charger.

10. The system of claim 1, comprising the data processing system to:
detect a state of charge of the first battery;
compare the state of charge of the first battery with the power reservation threshold;
provide, based on the comparison of the state of charge of the first battery with the power reservation threshold, to a computing device remote from the data processing system, a prompt comprising a request to allow the second battery to drain;
receive, responsive to the prompt, an indication from the computing device to allow the second battery to drain; and
provide, responsive to the indication from the computing device to allow the second battery to drain, a command to block charging of the second battery by the first battery.

11. A method, comprising:
identifying, by a data processing system comprising one or more processors and memory responsive to a time duration for which a vehicle has been inactive, that an inactive state of a first battery of the vehicle has exceeded an inactivity threshold for the first battery, wherein the first battery is configured to deliver power to a motor of the vehicle to drive the vehicle and provide energy to a second battery of the vehicle;
determining, based on the inactive state exceeding the inactivity threshold, that the vehicle should enter the energy reservation mode;
identifying a vehicle charging unit proximate the vehicle responsive to the determination that the vehicle should enter the energy reservation mode;
determining, based on a location of the vehicle and a location of the charging unit, a first amount of energy needed by the first battery for the vehicle to reach the charging unit;
determining, based on the first amount of energy, a power reservation threshold for the first battery; and
determining, by the data processing system based on the first amount of energy, a power reservation threshold for the first battery; and
modifying, based on the power reservation threshold, a level of energy provided by the first battery to the second battery to maintain at least the first amount of energy in the first battery.

12. The method of claim 11, wherein:
the first battery is configured to deliver power with a first voltage to one or more electric motors drive the vehicle, and the first battery comprises a battery pack comprising a plurality of battery cells; and
the second battery is configured to deliver power with a second voltage to one or more electric components of the vehicle different from the one or more electric motors, the second voltage less than the first voltage.

13. The method of claim 11, comprising:
determining, by the data processing system, a state of the vehicle; and
determining, by the data processing system responsive to the state of the vehicle, that the inactive state of the first battery or the second battery has exceeded the inactivity threshold.

14. The method of claim 11, comprising:
identifying, by the data processing system, a health of the first battery; and
establishing, by the data processing system, the power reservation threshold for the first battery based on the first amount of energy and the health of the first battery.

15. The method of claim 11, comprising:
predicting, by the data processing system, an ambient temperature of the first battery over a time interval; and
establishing, by the data processing system, the power reservation threshold for the first battery based on the first amount of energy and the predicted ambient temperature of the first battery over the time interval.

16. The method of claim 11, comprising:
determining, by the data processing system, a level of inactivity of the vehicle;
determining, by the data processing system responsive to the level of inactivity exceeding an inactivity threshold, to identify a plurality of chargers within a radius threshold of a location of the vehicle;
determining, by the data processing system, a plurality of amounts of energy to drive the vehicle from the location to the plurality of chargers;
ranking, by the data processing system, the plurality of chargers based on the plurality of amounts of energy; and
selecting, by the data processing system, the charger from the plurality of chargers based on the ranking.

17. The method of claim 11, comprising:
determining, by the data processing system, the vehicle is parked at a location;
determining, by the data processing system, a first distance between the charger and the location;
identifying, by the data processing system, a second charger located a second distance from the location, the second distance less than the first distance;
determining, by the data processing system, a second amount of energy to drive the vehicle from the location to the second charger, the second amount of energy greater than the first amount of energy; and
selecting, by the data processing system responsive to the first amount of energy less than the second amount of energy, the charger and the first amount of energy to use to set the threshold.

18. The method of claim 11, comprising:
determining, by the data processing system, the vehicle is unoccupied for a duration;
providing, by the data processing system responsive to the vehicle unoccupied for the duration, a prompt to a computing device remote from the data processing system; and
receiving, by the data processing system responsive to the prompt, an indication to prevent the delivery of power from the first battery to the second battery to maintain at least the first amount of energy in the first battery to drive the vehicle to the charger.

* * * * *